United States Patent
Wagoner et al.

(10) Patent No.: US 9,793,788 B2
(45) Date of Patent: Oct. 17, 2017

(54) ENERGY STORAGE SYSTEM FOR RENEWABLE ENERGY SOURCE

(71) Applicant: General Electric Company, Schenectady, NY (US)

(72) Inventors: Robert Gregory Wagoner, Roanoke, VA (US); Harold Robert Schnetzka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 656 days.

(21) Appl. No.: 14/136,018

(22) Filed: Dec. 20, 2013

(65) Prior Publication Data

US 2015/0180323 A1    Jun. 25, 2015

(51) Int. Cl.
*H02J 1/10* (2006.01)
*H02J 3/38* (2006.01)
(Continued)

(52) U.S. Cl.
CPC ............... *H02M 1/083* (2013.01); *H02J 3/32* (2013.01); *H02J 3/386* (2013.01); *H02J 7/35* (2013.01); *H02M 3/158* (2013.01); *H02M 3/335* (2013.01); *H02M 3/33569* (2013.01); *H02J 7/34* (2013.01); *H02M 7/217* (2013.01); *Y02B 70/1425* (2013.01); *Y02E 10/763* (2013.01);
(Continued)

(58) Field of Classification Search
CPC ............. H02M 3/33584; H02M 3/337; H02M 3/33538; H02M 7/217; H02M 7/5387; H02M 7/00; H03H 7/38

USPC ................. 307/23, 82, 10.1, 9.1, 80, 66, 18; 363/17, 16, 18, 127, 126
See application file for complete search history.

(56) References Cited

U.S. PATENT DOCUMENTS

2003/0218887 A1* 11/2003 Kojori ................. H02P 23/0004
  363/16
2007/0041222 A1*  2/2007 Eguchi .................... H02M 1/10
  363/17

(Continued)

FOREIGN PATENT DOCUMENTS

WO    WO 2011/082855    7/2011

OTHER PUBLICATIONS

Kim et al., Grid-Tied Power Converter for Battery Energy Storage Composed of 2-Stage DC-DC Converter, Journal of Electrical Engineering & Technology, vol. 8, No. 6, Nov. 2013, pp. 742-750.
(Continued)

*Primary Examiner* — Rexford Barnie
*Assistant Examiner* — Jagdeep Dhillon
(74) *Attorney, Agent, or Firm* — Dority & Manning, P.A.

(57) ABSTRACT

An energy storage system for use in a renewable energy power system is provided. More particularly, an energy storage system can be coupled to the DC bus of a power converter in a renewable energy power system. A switching power supply can be coupled between the energy storage device and the DC bus of the power converter. The switching power supply can include a bi-directional resonant DC to DC converter. The bi-directional resonant converter can include a plurality of switching elements, a resonant circuit coupled to the at least one switching element, and a filtering circuit coupled to the resonant circuit. The bi-directional resonant converter can be configured to accommodate power flow in at least two directions.

4 Claims, 5 Drawing Sheets

(51) Int. Cl.
*H02J 9/00* (2006.01)
*H02M 1/08* (2006.01)
*H02M 3/335* (2006.01)
*H02J 7/35* (2006.01)
*H02M 3/158* (2006.01)
*H02J 3/32* (2006.01)
*H02M 7/217* (2006.01)
*H02J 7/34* (2006.01)

(52) U.S. Cl.
CPC ............ *Y02E 10/766* (2013.01); *Y02E 70/30* (2013.01); *Y02E 70/40* (2013.01); *Y10T 307/344* (2015.04)

(56) References Cited

U.S. PATENT DOCUMENTS

| | | | | |
|---|---|---|---|---|
| 2007/0070655 | A1* | 3/2007 | Eguchi | H02M 1/10 363/17 |
| 2012/0053750 | A1 | 3/2012 | Viassolo et al. | |
| 2012/0257429 | A1* | 10/2012 | Dong | H02M 3/1582 363/127 |
| 2013/0343107 | A1* | 12/2013 | Perreault | H03H 7/38 363/67 |
| 2014/0191582 | A1* | 7/2014 | Deboy | H02J 3/383 307/82 |
| 2014/0254223 | A1* | 9/2014 | Limpaecher | H02M 7/4826 363/126 |
| 2014/0313784 | A1* | 10/2014 | Strzalkowski | H02M 3/33584 363/17 |
| 2014/0334189 | A1* | 11/2014 | Yan | H02M 3/33584 363/17 |
| 2014/0346868 | A1* | 11/2014 | Kuznetsov | H02J 4/00 307/18 |

OTHER PUBLICATIONS

European Search Report and Written Opinion issued in connection with corresponding EP Application No. 14197051.7-1804 dated Jun. 2, 2015.

Hwang et al., "Soft-switching Bi-directional DC/DC converter using a LC series resonant circuit", Electrical Machines and Systems (ICEMS), International Conference on, IEEE, pp. 1-5, Aug. 20, 2011.

* cited by examiner

ENERGY STORAGE SYSTEM FOR RENEWABLE ENERGY SOURCE

FIELD OF THE INVENTION

The present disclosure relates generally to renewable energy power systems, and more particular to an energy storage system for use in a renewable energy power system.

BACKGROUND OF THE INVENTION

Renewable energy power systems, such as wind energy power systems and solar energy power systems, often include a power converter with a regulated DC bus. For example, wind power systems, such as wind driven doubly-fed induction generator (DFIG) systems or full power conversion systems, can include a power converter with an AC-DC-AC topology. Solar power systems can include a power converter that has a DC-DC-AC topology.

An energy storage system can be coupled to the DC bus of a power converter in a renewable energy system. The energy storage system can be used, for instance, to apply power to the DC bus of the power converter during transient conditions. A switching power supply can be provided to transfer energy back and forth between the DC bus of the power converter and the energy storage device. For instance, the switching power supply can include a DC to DC converter configured to convert a first voltage on the DC bus to a second voltage at the energy storage device, and vice versa. It can be desirable for the switching power supply to be bi-directional to allow not only for power flow from the energy storage device to the DC bus during transient conditions but also to allow power flow from the DC bus to the energy storage device, for instance, to charge the energy storage device.

A need exists for an improved switching power supply for an energy storage system that provides for the more efficient transfer of energy between the energy storage system and the DC bus of a power converter. A switching power supply that provides for improved bi-directional power flow between the energy storage system and the DC bus would be particularly useful.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a renewable energy power system. The renewable energy power system includes a power converter having a DC bus and an energy storage system coupled to the DC bus of the power converter. The energy storage system includes an energy storage device and a switching power supply coupled between the energy storage device and the DC bus of the power converter. The renewable energy power system further includes a control system configured to operate the energy storage system in a first mode where power flows in a first direction from the DC bus to the energy storage device and in a second mode where power flows in a second direction from the energy storage device to the DC bus. The switching power supply includes a bi-directional resonant DC to DC power converter configured to accommodate bi-directional power flow between the energy storage device and the DC bus.

Another example aspect of the present disclosure is directed to a bi-directional resonant DC to DC power converter. The bi-directional resonant DC to DC converter includes a first transistor having a gate, a collector, and an emitter and a second transistor having a gate, a collector, and an emitter. The collector of the second transistor is coupled to the emitter of the first transistor. A resonant circuit is coupled to a node between the first transistor and the second transistor. The resonant circuit has a first inductor and a first capacitor. A filtering circuit is coupled to a node between the first inductor and the first capacitor. The filtering circuit includes a second inductor and a second capacitor.

Yet another example aspect of the present disclosure is directed to a method of operating an energy storage system. The method includes selecting operation of the energy storage system in a first mode and providing power from a DC bus to an energy storage system via a bi-directional resonant DC to DC converter coupled between the DC bus and the energy storage device. The method includes controlling the bi-directional resonant DC to DC converter such that power flows in a first direction from the DC bus to the energy storage device. The bi-directional resonant DC to DC power converter is configured to accommodate bi-directional power flow between the energy storage device and the DC bus.

Variations and modifications can be made to these example aspects of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to energy storage systems for use in renewable energy power systems. More particularly, an energy storage system can be coupled to the DC bus of a power converter used in a renewable energy power system. For example, the energy storage system can be coupled to the DC bus of an AC to DC to AC converter used in a wind energy power system. As another example, the battery energy storage system can be coupled to the DC bus of a DC to DC to AC converter used in a solar energy system.

The energy storage system can include an energy storage device, such as a battery storage device, fuel cell, capacitor, or other suitable energy storage device. A switching power supply can be coupled between the energy storage device and the DC bus of the power converter. A control system can control the switching power supply to regulate power flow between the energy storage device and the DC bus. For instance, the switching power supply can be controlled to convert a first DC voltage at the DC bus to a second DC voltage at the battery energy storage device.

According to example aspects of the present disclosure, the switching power supply can include a bi-directional resonant DC to DC converter. For instance, in one example implementation, a zero current switching (ZCS) quasi-resonant buck converter designed for half-wave operation can be used as the switching power supply. Other bi-directional resonant converters can be used without deviating from the scope of the present disclosure, such as a zero voltage switching (ZVS) converter, a boost converter, a buck/boost converter, or other suitable converter.

In particular implementations, the bi-directional resonant DC to DC converter can include a topology that includes a first switching element and a second switching element coupled in series with one another. The first switching element can be a first insulated gate bipolar transistor (IGBT) having a gate, a collector, and an emitter. The second switching element can be a second insulated gate bipolar transistor (IGBT) having a gate, a collector, and an emitter. The collector of the first IGBT can be coupled to a positive terminal of the DC bus. The emitter of the first IGBT can be coupled to the collector of the second IGBT. The emitter of the second IGBT can be coupled to a negative terminal of the DC bus. A first diode can be coupled in parallel with the first IGBT. A second diode can be coupled in parallel with the second IGBT.

The bi-directional resonant DC to DC converter can include a resonant circuit coupled to a node between the first switching element and the second switching element. The resonant circuit can be a first LC circuit having a first inductor and a first capacitor. The first inductor can be coupled to the node between the first switching element and the second switching element. The first capacitor can be coupled between the first inductor and either the positive or negative terminal of the DC bus.

The bi-directional resonant DC to DC converter can further include a filtering circuit coupled to resonant circuit. In particular, the filtering circuit can be coupled to a node between the first inductor and the first capacitor of the resonant circuit. The filtering circuit can be a second LC circuit having a second inductor and a second capacitor. The second inductor can be coupled to the node between the first capacitor and the first capacitor. The second capacitor can be coupled between the second inductor and either the positive or negative terminal of the DC bus.

According to particular aspects of the present disclosure, the bi-directional resonant converter can be configured to accommodate power flow in two directions. For instance, a control system can operate the energy storage system in a first mode such that power flows in a first direction from the DC bus to the energy storage device, for instance, to charge the energy storage device. The control system can also be configured to operate the energy storage system in a second mode such that power flows in a second direction from the energy storage device to the DC bus, for instance, to provide supplemental power to the DC bus during transient conditions (e.g. a reduction in wind in a wind energy system or a reduction in sunlight in a solar energy system).

In particular implementations during operation of the energy storage system in a first mode, the control system can be configured to coordinate the switching of the first switching element with zero current crossings of a current flowing in the first switching element to reduce switching losses. For instance, the control system can be configured to switch the first switching element when current is flowing in a diode coupled in parallel with the first switching element.

During operation of the energy storage system in a second mode, the control system can be configured to coordinate the switching of the second switching element with zero current crossings of a current flowing in the second switching element to reduce switching losses. For instance, the control system can be configured to switch the second switching element when current is flowing in a diode coupled in parallel with the second switching element.

The use of a bi-directional resonant converter as the switching power supply can be more efficient than standard "hard switching" converters, for instance, as a result of switching at zero current crossings. In this way, less energy losses occur in charging and/or discharging the energy storage device. Other advantages of using a bi-directional resonant converter can include elimination of the need for a power filter to reduce ripple voltage. The resonant power converter can be of a reduced size and cost relative to a standard hard switching converter. In addition, the bi-directional resonant power converter can reduce standby losses and cooling system requirements.

Figure 1:
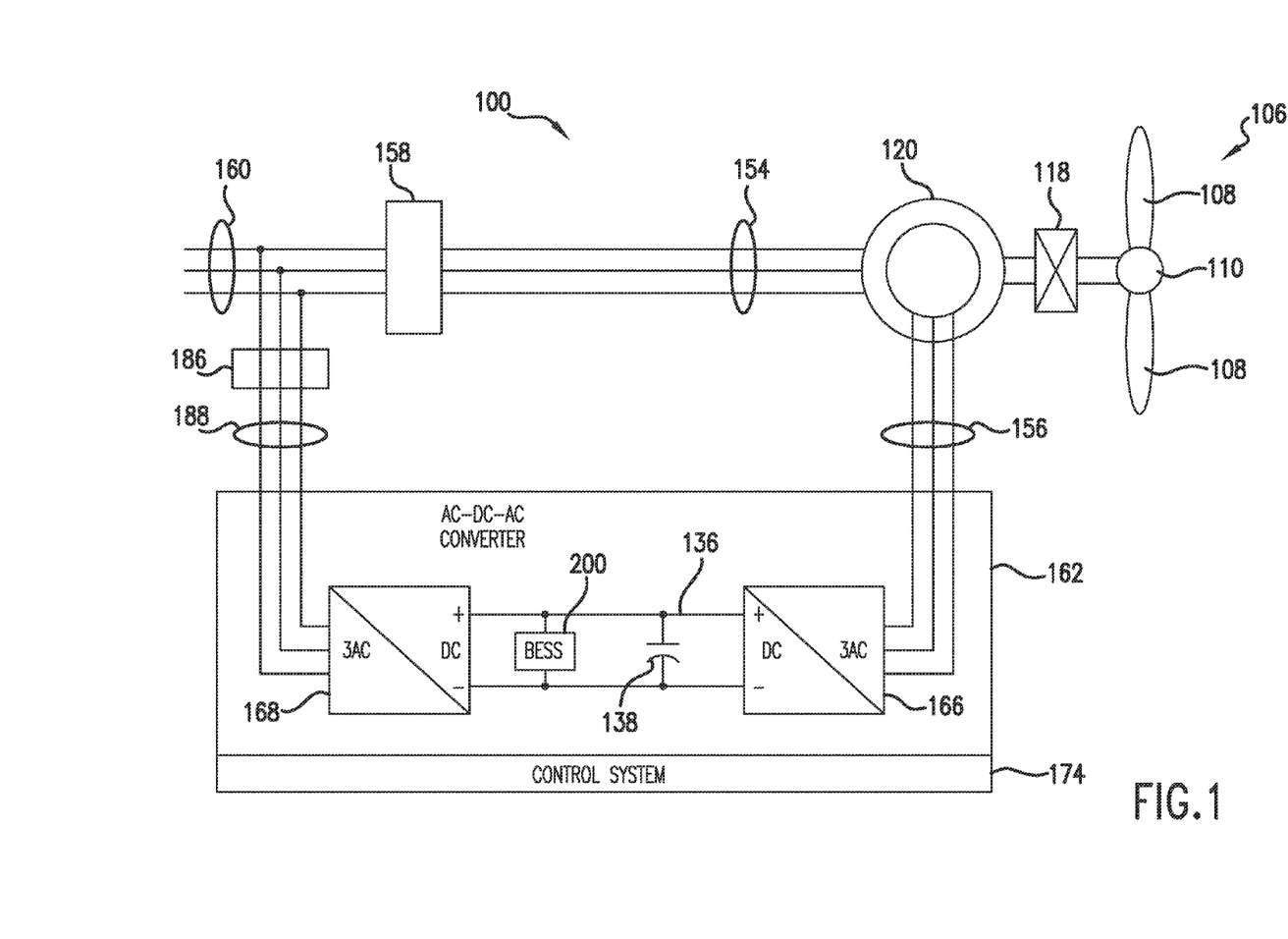
FIG. 1 depicts an example renewable energy power system according to example embodiments of the present disclosure.

With reference now to the FIGS., example embodiments of the present disclosure will now be discussed in detail. FIG. 1 depicts an example wind driven doubly-fed induction generator (DFIG) system 100. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) switching elements. The rotor side converter 166 and the line side converter 168 can be coupled via a DC bus 136 across which is the DC bus capacitor 138.

The power converter 162 can be coupled to a control system 174 to control the operation of the rotor side converter 166 and the line side converter 168 and other aspects of the power system 100. The control system 174 can include any number of control devices. In one implementation, the control system 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and in other aspects of the power system 100, such as a power switching supply used in an energy storage system 200.

In operation, alternating current power generated at DFIG 120 by rotation of the rotor 106 is provided via a dual path to electrical grid 160. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC bus 136. Switching elements (e.g. IGBTs) used in bridge circuits of the rotor side power converter 166 can be modulated to convert the AC power provided from the rotor bus 156 into DC power suitable for the DC bus 136.

The line side converter 168 converts the DC power on the DC bus 136 into AC output power suitable for the electrical grid 160. In particular, switching elements (e.g. IGBTs) used in bridge circuits of the line side power converter 168 can be modulated to convert the DC power on the DC bus 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to example aspects of the present disclosure, a battery energy storage system 200 can be coupled to the power converter 162 of the power system 100. The present disclosure is discussed with reference to a battery energy storage system for purposes of illustration and discussion. Those of ordinary skill in the art, using the disclosures provided herein, should understand that aspects of the present disclosure are also applicable in other energy storage systems.

The battery energy storage system 200 can be coupled to the DC bus 136 of the power converter 162. The energy storage system 200 can be used to provide power to the DC bus 136 under certain conditions. For instance, the energy storage system 200 can be used to provide power to the DC bus 136 to increase output of the power system 100 when wind speed drops. Power can also be supplied and stored in the energy storage system 200 during operation of the DFIG system 100.

Figure 2:
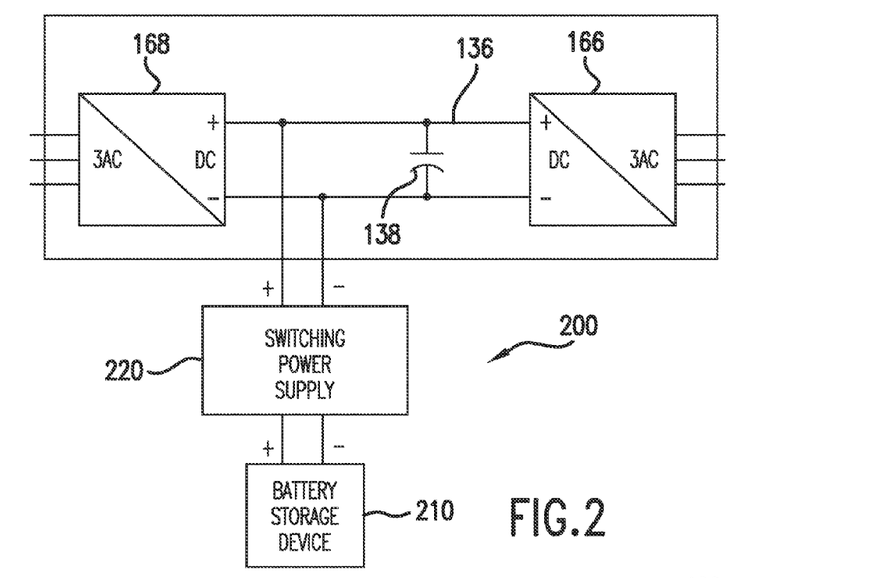
FIG. 2 depicts an example energy storage system coupled to the DC bus of a power converter according to example embodiments of the present disclosure.

FIG. 2 depicts an example battery energy storage system 200 coupled to the DC bus 136 of a power converter 162. The battery energy storage system 200 can include a battery energy storage device 210. The battery energy storage device 210 can be coupled to the DC bus 136 via a switching power supply 220, such as a DC to DC converter. The switching power supply 220 can convert the DC power on the DC bus to a DC voltage that is suitable for application to the battery energy storage device 210.

The switching power supply 220 can include a plurality switching elements (e.g. IGBTs or other switching elements). The switching elements can be controlled, for instance, by control system 174 (FIG. 1) to regulate power flow in the energy storage system 200. For example, during times of high power output, a first switching element can be controlled such that power flows in a first direction from the DC bus 136 to the energy storage device 210 to charge the energy storage device 210. During times of low power output, a second switching element can be controlled such that power flows in a second direction from the energy storage device 210 to the DC bus 136 for use in boosting output of the power system.

According to particular aspects of the present disclosure, the switching power supply 220 can be a bi-directional resonant DC to DC converter. The bi-directional resonant DC to DC converter can be a DC to DC converter configured to convert a first DC voltage at the DC bus 136 to a second DC voltage at the energy storage device 210. In particular embodiments, the bi-directional resonant DC to DC converter can be any resonant converter capable of accommodating power flow in two directions.

Figure 3:
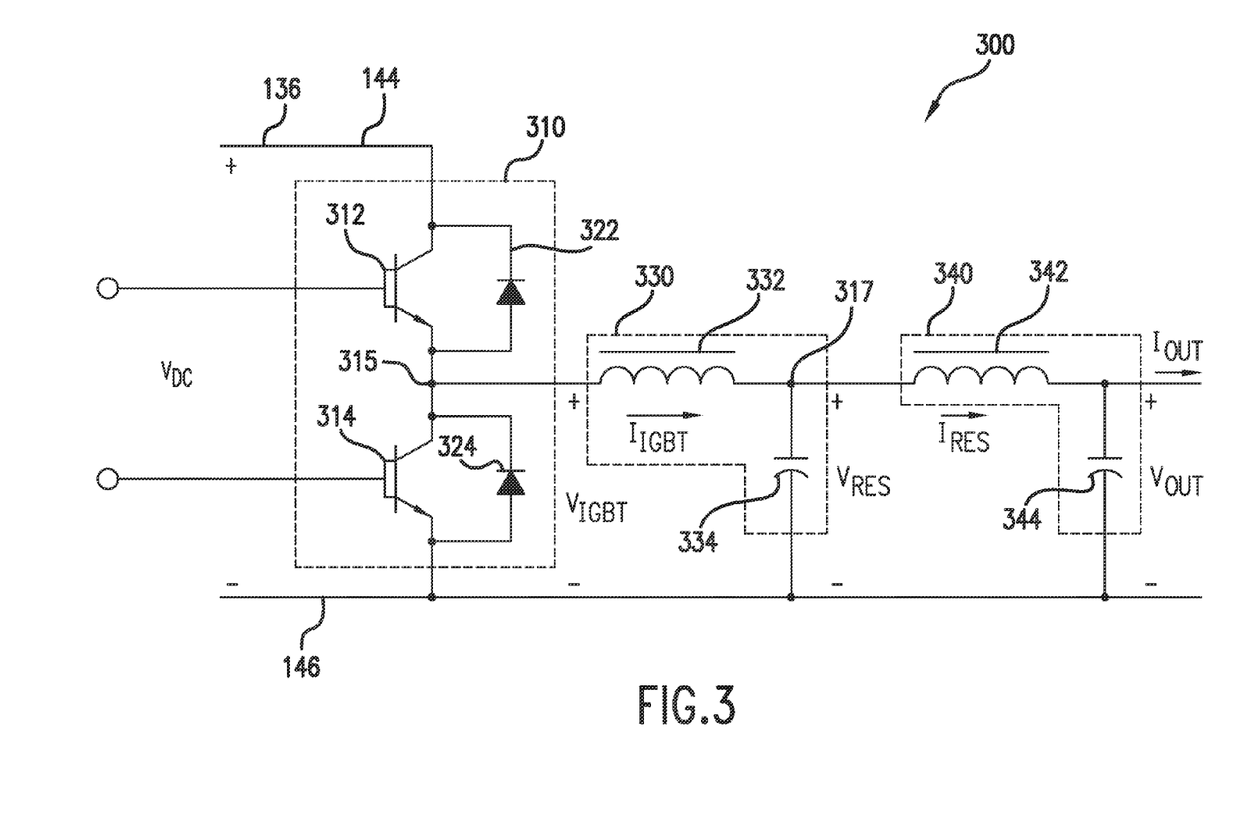
FIG. 3 depicts example topology for an example switching power supply for an energy storage system according to example embodiments of the present disclosure.

FIG. 3 depicts example topology for a bi-directional resonant DC to DC converter 300 that can be used as a switching power supply according to example aspects of the present disclosure. The bi-directional resonant DC to DC converter 300 can include a bridge circuit 310 coupled to a DC bus 136. The DC bus 136 can have a positive terminal 144 and a negative terminal 146 The bridge circuit 310 can include a first switching element 312 and a second switching element 314 coupled in series with one another. The first switching element 312 and the second switching element 314 can be any suitable switching device, such as an IGBT, power MOSFET, or other suitable switching device.

For instance, the first switching element 312 can be a first IGBT having a gate, a collector, and an emitter. The second switching element 314 can be a second IGBT having a gate, a collector, and an emitter. The collector of the first IGBT 312 can be coupled to the positive terminal 144 of the DC bus 136. The emitter of the first IGBT 312 can be coupled to the collector of the second IGBT 314. The emitter of the second IGBT can be coupled to the negative terminal 146 of the DC bus 136.

The first switching element 312 can be coupled to a first antiparallel diode 322. The second switching element 314 can be coupled to a second antiparallel diode. One or more of the first switching element 312 and the second switching element 314 can be controlled to convert a first DC voltage $V_{AC}$ on the DC bus 136 to a second DC voltage $V_{OUT}$ at the energy storage device. More particularly, pulse frequency modulation commands (e.g. gate drive commands) can be provided to the first switching element 312 or the second switching element 314 to adjust the operating frequency of the bi-directional resonant DC to DC converter to regulate power flow between the DC bus 136 and an energy storage device.

The bi-directional resonant DC to DC converter 300 includes a resonant circuit 330 coupled to the bridge circuit 310. More particularly, the resonant circuit 330 is coupled to a node 315 between the first switching element 312 and the second switching element 314. The resonant circuit 330 includes an LC circuit having a first inductor 332 and a second inductor 334. The first inductor 332 is coupled to the node 315 between the first switching element 312 and the second switching element 314. The first capacitor is coupled between the first inductor 332 and the negative terminal 146 of the DC bus 136.

The bi-directional resonant DC to DC converter 300 can further include a filtering circuit 340 coupled to the resonant circuit 330. The filtering circuit 340 can be an LC circuit and can include a second inductor 342 and a second capacitor 344. The second inductor 342 can be coupled to a node 317 between the first inductor 332 and the first capacitor 334. The second capacitor 344 can be coupled between the second inductor 342 and the negative terminal 146 of the DC bus. The inductance of the second inductor 342 can be significantly greater (e.g. 10× greater or more) than the inductance of the first inductor 332. Similarly, the capacitance of the second capacitor 344 can be significantly greater (e.g. 10× greater or more) than the capacitance of the second inductor 334. The filtering circuit 340 can be used to filter the output of the resonant circuit 330 to provide a DC current $I_{out}$ and DC voltage $V_{out}$ at the energy storage device. The DC voltage $V_{out}$ can be the voltage across the second capacitor 344.

The example bi-directional resonant DC to DC converter 300 of FIG. 3 is discussed with reference to the resonant circuit 330 and the filtering circuit 340 being coupled to the negative terminal 146 of the DC bus 136. Those of ordinary skill in the art, using the disclosures provided herein, will understand that the resonant circuit 330 and the filtering circuit 340 can be coupled to the positive terminal 144 of the DC bus 136 without deviating from the scope of the present disclosure. For instance, the first capacitor 334 can be coupled between the first inductor 332 and a positive terminal 144 of the DC bus 136. The second capacitor 344 can be coupled between the second inductor 342 and the positive terminal 144 of the DC bus 136.

The topology of the bi-directional resonant DC to DC converter 300 can accommodate power flow in two directions. More particularly, power can flow in a first direction through the bi-directional resonant DC to DC converter 300 from the DC bus to the energy storage device. Power can also flow in a second direction from the energy storage device to the DC bus.

Figure 4:
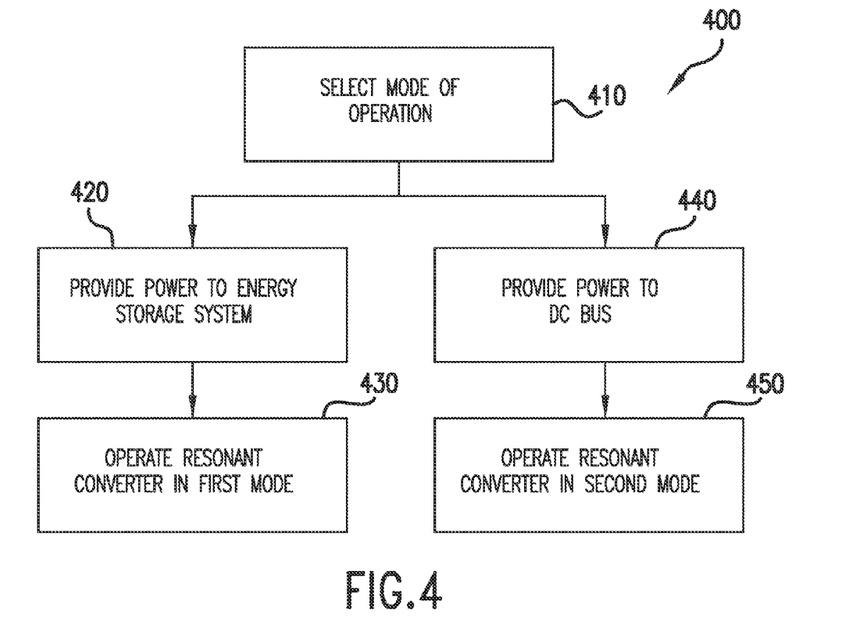
FIG. 4 depicts a flow diagram of an example method of operating an energy storage system according to example embodiments of the present disclosure.

FIG. 4 depicts a flow diagram of an example method 400 for operating an energy storage system according to an example embodiment of the present disclosure. The method 400 can be implemented using any suitable energy storage system, such as the energy storage system 200 depicted in FIG. 2. In addition, FIG. 4 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (410), the method includes selecting a mode of operation for the energy storage system. For instance, the energy storage system can be operated in a first mode or in a second mode. After selecting to operate the energy storage system in the first mode, the method can include providing power from the DC bus to an energy storage device via a bi-directional resonant DC to DC converter (420). The bi-directional resonant DC to DC converter can be controlled to operate the resonant converter in the first mode (430) such that power flows from the DC bus to the energy storage device.

More particularly with reference to FIG. 3, the first switching element 312 can be operated for power flow from the DC bus 136 to the energy storage device. Control of the load voltage and current applied to the energy storage device can be achieved by operating the first switching element 312 at variable frequency. According to particular aspects of the present disclosure, the first switching element 312 can be controlled such that the switching is coordinated with zero current crossings of the current in the first switching element 312. For instance, the control system can only allow the first switching element 312 to switch when current is flowing in the diode 322.

Initially, the first switching element 312 can be at zero current because there is initially no load current. As soon as the resonant circuit 330 is set in motion, the first switching element 312 can be switched on at zero current because the current goes below zero in every resonant cycle. Similarly, the switching element 312 can be switched off at zero current because the gate is turned off during the period of time after the current resonates to negative (e.g. current is flowing in the parallel diode 322).

Figure 5:
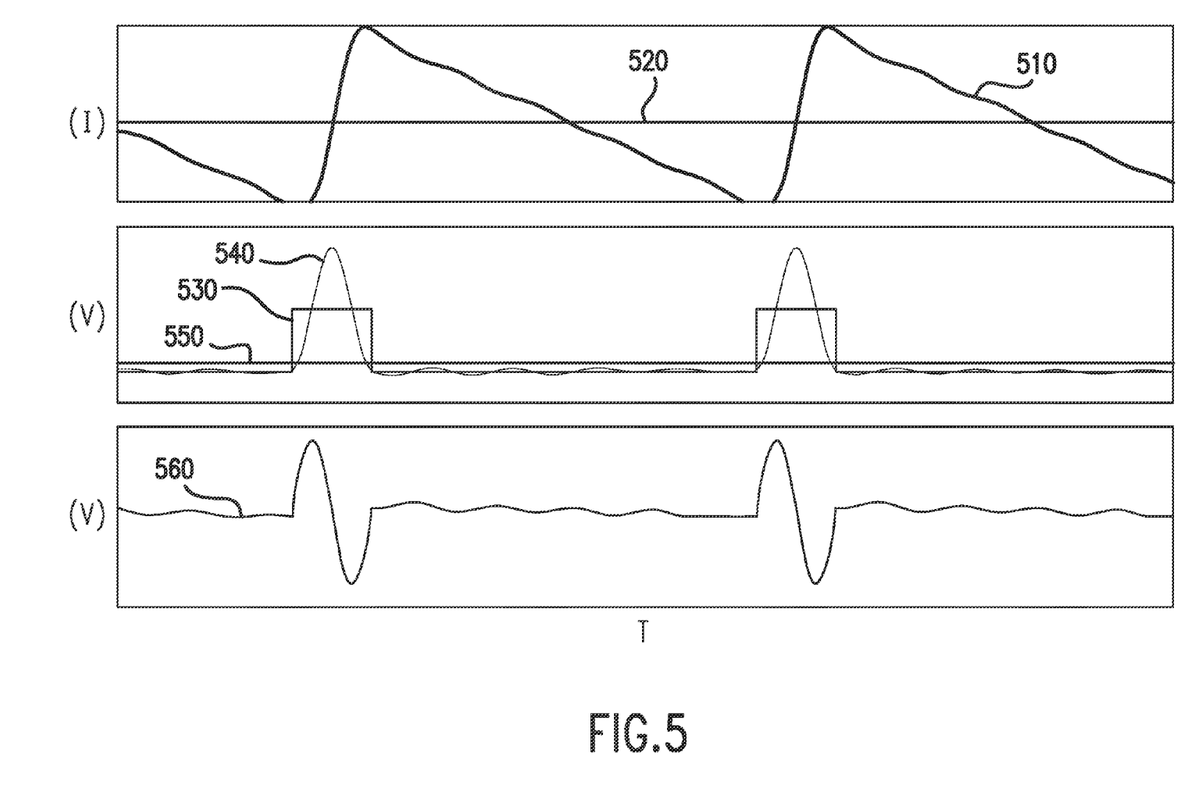
FIG. 5 depicts simulated waveforms for operation of the switching power supply with power flow from a DC bus of a power converter to an energy storage device according to example embodiments of the present disclosure.

FIG. 5 depicts simulated waveforms for the resonant DC to DC converter 300 of FIG. 3 when operating the resonant DC to DC converter in the first mode. Curve 510 depicts $I_{RES}$ (FIG. 3) flowing through the second inductor 342. Current $I_{RES}$ is filtered by filtering circuit 340 to provide current $I_{OUT}$, which is demonstrated by curve 520 to be substantially DC. Curve 530 depicts $V_{IGBT}$ across the node 315 and the negative terminal 146 of the DC bus 136 resulting from switching the first switching element 312 at zero current crossings of current $I_{IGBT}$ flowing in the first switching element 312 as shown by curve 560. Curve 540 shows $V_{RES}$, which is the voltage across the first capacitor 334. Curve 550 shows $V_{OUT}$, which is the voltage across the second capacitor 344, which is demonstrated by curve 550 to be substantially DC.

Referring back to FIG. 4, after selecting to operate the energy storage system in the second mode, the method can include providing power from the energy storage device to the DC bus via the bi-directional resonant DC to DC converter (440). The bi-directional resonant DC to DC converter can be controlled to operate the resonant converter in the second mode (450) such that power flows from the energy storage device to the DC bus.

More particularly with reference to FIG. 3, the second switching element 314 can be operated for power flow from the energy storage device to the DC bus 136. Control of the load voltage and current applied to the DC bus 136 can be achieved by operating the second switching element 314 at variable frequency. According to particular aspects of the present disclosure, the second switching element 314 can be controlled such that the switching of the switching element 314 is coordinated with zero current crossings of the current in the second switching element 314. For instance, the control system can only allow the second switching element 314 to switch when current is flowing in the diode 324.

Initially, the second switching element 314 can be at zero current because there is initially no load current. As soon as the resonant circuit 330 is set in motion, the second switching element 314 can be switched on at zero current because the current goes below zero in every resonant cycle. Similarly, the second switching element 314 can be switched off at zero current because the gate is turned off during the period of time after the current resonates to negative (e.g. current is flowing in the parallel diode 324).

Figure 6:
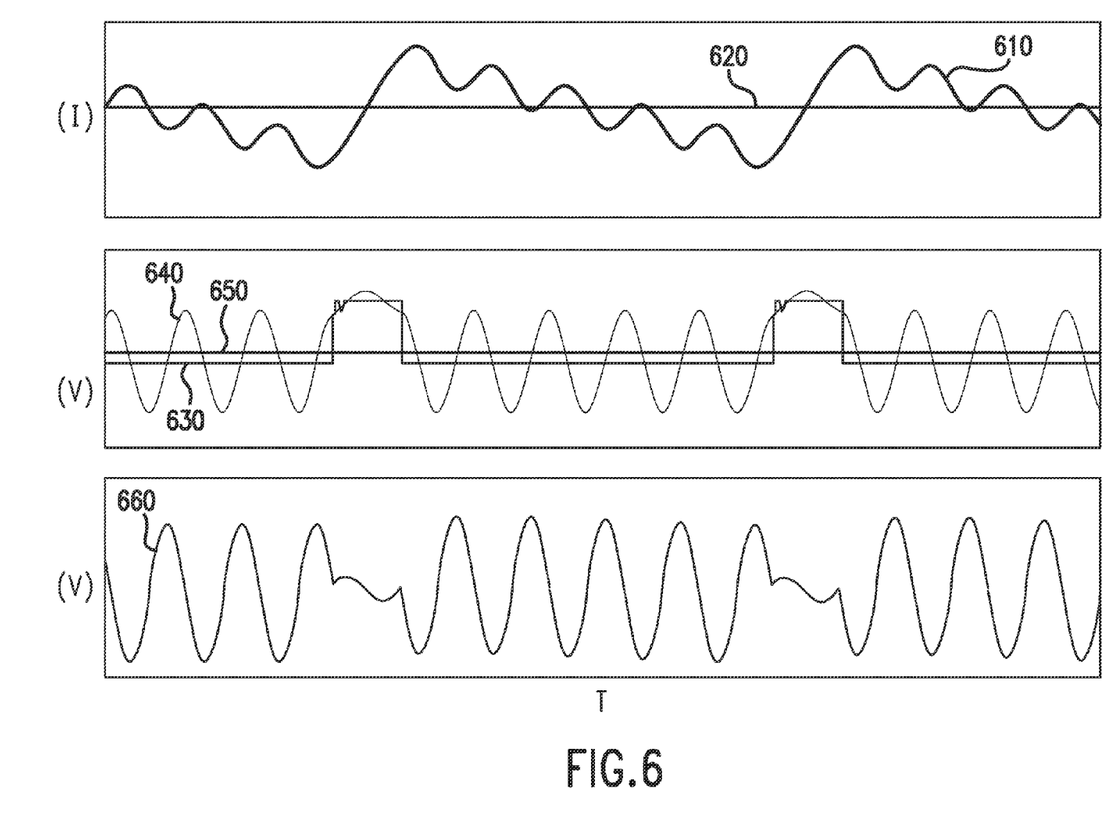
FIG. 6 depicts simulated waveforms for operation of the switching power supply with power flow from the energy storage device to the DC bus of a power converter according to example embodiments of the present disclosure.

FIG. 6 depicts simulated waveforms for the resonant DC to DC converter 300 of FIG. 3 when operating the resonant DC to DC converter in the second mode. Curve 610 depicts $I_{RES}$ (FIG. 3) flowing through the second inductor 342. Curve 620 represents $I_{OUT}$ provided from the energy storage device. Curve 630 depicts $V_{IGBT}$ across the node 315 and the negative terminal 146 of the DC bus 136 resulting from switching the second switching element 314 at zero current crossings of current $I_{IGBT}$ flowing in the first switching element 314 as shown by curve 660. Curve 640 shows $V_{RES}$, which is the voltage across the first capacitor 334. Curve 650 shows $V_{OUT}$, which is the voltage across the second capacitor 344.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bi-directional resonant DC to DC power converter comprising:
    a first transistor having a gate, a collector, and an emitter;
    a second transistor having a gate, a collector, and an emitter, the collector of the second transistor being coupled to the emitter of the first transistor;
    a resonant circuit coupled to a node between the first transistor and the second transistor, the resonant circuit having a first inductor and a first capacitor, the resonant circuit configured such that a resonant current flowing through the first inductor goes below zero in every resonant cycle;
    a filtering circuit coupled to a node between the first inductor and the first capacitor, the filtering circuit comprising a second inductor and a second capacitor, the filtering circuit configured to filter the resonant current flowing through the first inductor to provide a substantially DC output.

2. The bi-directional resonant DC to DC converter of claim 1, wherein the collector of the first transistor is coupled to a positive terminal of a DC source and the emitter of the second transistor is coupled to a negative terminal of the DC source.

3. The bi-directional resonant DC to DC converter of claim 2, wherein the first capacitor and the second capacitor are coupled to the negative terminal of the DC source.

4. The bi-directional resonant DC to DC converter of claim 2, wherein the first capacitor and the second capacitor are coupled to the positive terminal of the DC source.

* * * * *